US012123480B2

(12) United States Patent
Fleming et al.

(10) Patent No.: US 12,123,480 B2
(45) Date of Patent: Oct. 22, 2024

(54) RUDDER AND BRAKE PEDAL DEVICES

(71) Applicant: Safran Electronics & Defense, Avionics USA, LLC, Grand Prairie, TX (US)

(72) Inventors: Ryan Fleming, Grand Prairie, TX (US); Andrew Wright, Grand Prairie, TX (US)

(73) Assignee: Safran Electronics & Defense, Avionics USA, LLC, Grand Prairie, TX (US)

( * ) Notice: Subject to any disclaimer, the term of this patent is extended or adjusted under 35 U.S.C. 154(b) by 121 days.

(21) Appl. No.: 17/954,974

(22) Filed: Sep. 28, 2022

(65) Prior Publication Data

US 2024/0102540 A1    Mar. 28, 2024

(51) Int. Cl.
*F16H 21/54*       (2006.01)
*B64C 13/04*       (2006.01)
*G05G 1/44*        (2008.04)
*G05G 11/00*       (2006.01)

(52) U.S. Cl.
CPC .......... *F16H 21/54* (2013.01); *B64C 13/044* (2018.01); *G05G 1/44* (2013.01); *G05G 11/00* (2013.01)

(58) Field of Classification Search
CPC .................................................. B64C 13/044
See application file for complete search history.

(56) References Cited

U.S. PATENT DOCUMENTS

2011/0108674 A1* 5/2011 Gardner ............... B64C 13/044
                                                          244/235

FOREIGN PATENT DOCUMENTS

EP     1873057 B1    5/2009
EP     2917102 B1    9/2016

OTHER PUBLICATIONS

European Patent Office, International Search Report and Written Opinion, Dec. 20, 2023.

* cited by examiner

*Primary Examiner* — Vicky A Johnson
(74) *Attorney, Agent, or Firm* — Umberg Zipser LLP; Ryan Dean

(57) ABSTRACT

Rudder pedal and brake inceptor devices are described that utilize a straight-line mechanism and rotary joints to achieve straight line motion in a compact volume. The devices can include four or more bar linkages that translate forward motion of a pedal into a rotary motion of a common shaft, such that forward motion of one pedal causes the other pedal to retract while allowing for yaw motion control of the aircraft.

18 Claims, 6 Drawing Sheets

RUDDER AND BRAKE PEDAL DEVICES

FIELD OF THE INVENTION

The field of the invention is rudder pedal and brake inceptor devices.

BACKGROUND

The following description includes information that may be useful in understanding the present invention. It is not an admission that any of the information provided herein is prior art or relevant to the presently claimed invention, or that any publication specifically or implicitly referenced is prior art.

Rudder pedal devices are typically integrated into the floor of an aircraft's cockpit. Often, these devices are complex and include a large number of components (i.e., articulations, connecting rods, pivots, etc.), which increase the overall weight and maintenance requirements of the devices.

Rudder pedal devices typically require substantial space due to the motion requirement for relatively straight horizontal rudder pedal inputs. A standard solution can have pedal arm lengths greater than 650 mm and corresponding large structural support below the cockpit floor. While linear bearings could be used to reduce the overall size, such bearings are generally disfavored because of their potential for jams and other issues which could prevent proper control of an aircraft. The large size of the rudder pedal unit adds to the cost and weight of the unit.

It is known that utilizing more curvature in the pedal motion, rather than straight-line motion, can reduce the pedal arm lengths and overall size of the unit. However, as the mechanism is reduced in size, the pedal can exhibit excessive vertical motion versus the desired forward and aft motion.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for rudder pedal units or devices that are more compact while allowing for linear motion of the pedals.

SUMMARY OF THE INVENTION

The inventive subject matter provides rudder control mechanisms, systems, and devices for controlling the rudder of an aircraft by taking an input from a pilot and translating that into movement of the rudder. Contemplated rudder pedal and brake inceptors comprise a frame and two pedal motion mechanisms connected to a main shaft which constrains the pedal rudder motion to move in opposite directions. Preferably, the main shaft is constrained to rotate within the frame.

As used herein, and as commonly used, the longitudinal direction is defined by the longitudinal axis of the aircraft, which extends from a front of the aircraft to the aft or rear of the aircraft. A latitudinal direction is perpendicular to the longitudinal direction and extends from a left side to a right side of the aircraft. A vertical direction is perpendicular to the longitudinal direction and the latitudinal direction and extends from a bottom to a top of the aircraft.

In some embodiments, a rudder input control device comprises a shaft that is coupled to a pair of pedals (i.e., a first pedal and a second pedal) via a first linkage and a second linkage. Each of the first and second linkages preferably comprises a multi-bar mechanism with one bar coincident with the frame and the pedal shaft constrained to the floating opposite bar such that the axis moves in a largely linear motion. A first component is configured to move longitudinally along an axis of the shaft in forward and aft directions based on a movement of the first or second pedal.

Specifically, the first component can be coupled to the first pedal via the first linkage, such that movement of the first pedal in a forward or aft direction causes movement of the first linkage, which in turn causes movement of the first component along the shaft. Similarly, the first component can also be coupled to the second pedal via the second linkage, such that movement of the second pedal in a forward or aft direction causes movement of the second linkage, which in turn causes movement of the first component along the shaft.

A sensor or mechanical device can be coupled to the first component or the shaft to convert movement of the first component or rotation of the shaft into an electric signal, which can be transmitted to a steering system, for example.

As a result of the interconnection of the pedals, when a force is applied to the first pedal to move the first pedal in the forward direction, the second pedal is moved a similar distance the aft direction. In a similar fashion, when a force is applied to the second pedal to move the second pedal in the forward direction, the first pedal is moved a similar distance in the aft direction.

In this manner, the pedals and first and second linkages allow for approximate straight-line motion which can be converted into rotational motion by the linkages. The inventive subject matter discussed herein eliminates the need for linear bearings by constraining pedal motion mechanically while providing a rotating shaft between the pedals to ensure the pedals move in an opposite direction from one another. The device can achieve forward and aft motion using rotary bearings with minimal vertical motion with using the device which can be placed within a smaller envelope, preferably at or above the floor. This reduces the occupied volume below the floor and potentially the high reaction loads which are generated by the traditional long moment arms for the same pilot input load.

In some embodiments, the shaft comprises a longitudinally splined interface and the first component comprises a shuttle constrained rotationally to the shaft. Controlled longitudinal displacement of the shuttle forward or aft on the shaft allows both pedals to move forward or aft in unison, respectively, for ergonomic pedal adjustment.

In other contemplated embodiments, a rudder input control device comprises a shaft that is coupled to a pair of pedals (i.e., a first pedal and a second pedal) via a first linkage and a second linkage. The shaft is configured to rotate about a first axis that based on movement of the first or second pedal.

Specifically, the shaft can be coupled to the first pedal via the first linkage, such that movement of the first pedal in a forward direction causes movement of the first linkage, which in turn causes the shaft to rotate about the first axis in a first direction. Similarly, the shaft can be coupled to the second pedal via the second linkage, such that movement of the second pedal in the forward direction causes movement of the second linkage, which in turn causes the shaft to rotate about the first axis in a second direction opposite of the first direction.

As a result of the interconnection of the pedals, when a force is applied to the first pedal to move the first pedal in the forward direction, the second pedal is moved a similar distance the aft direction. In a similar fashion, when a force is applied to the second pedal to move the second pedal in the forward direction, the first pedal is moved a similar distance in the aft direction.

The inventive subject matter discussed herein advantageously allows for linear straight-line motion of the pedals and linkages while permitting variations to the lengths of the links forming the linkages.

Various objects, features, aspects, and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
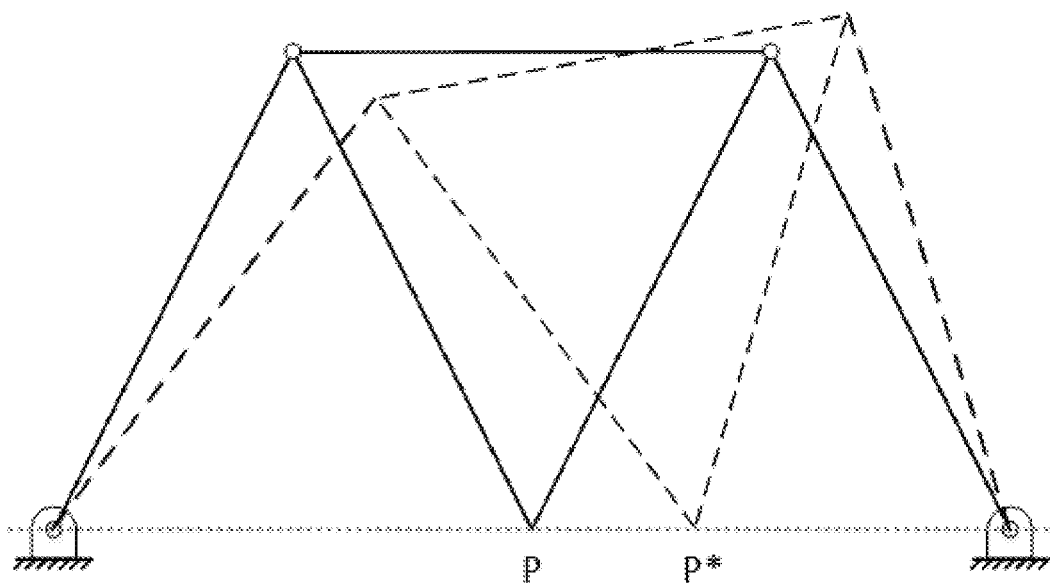
FIG. 1 illustrates a schematic of a Roberts linkage.

FIG. 1 illustrates a schematic of a Roberts linkage showing movement a point P to point P* and corresponding movement of the attached linkages.

Figure 2A:
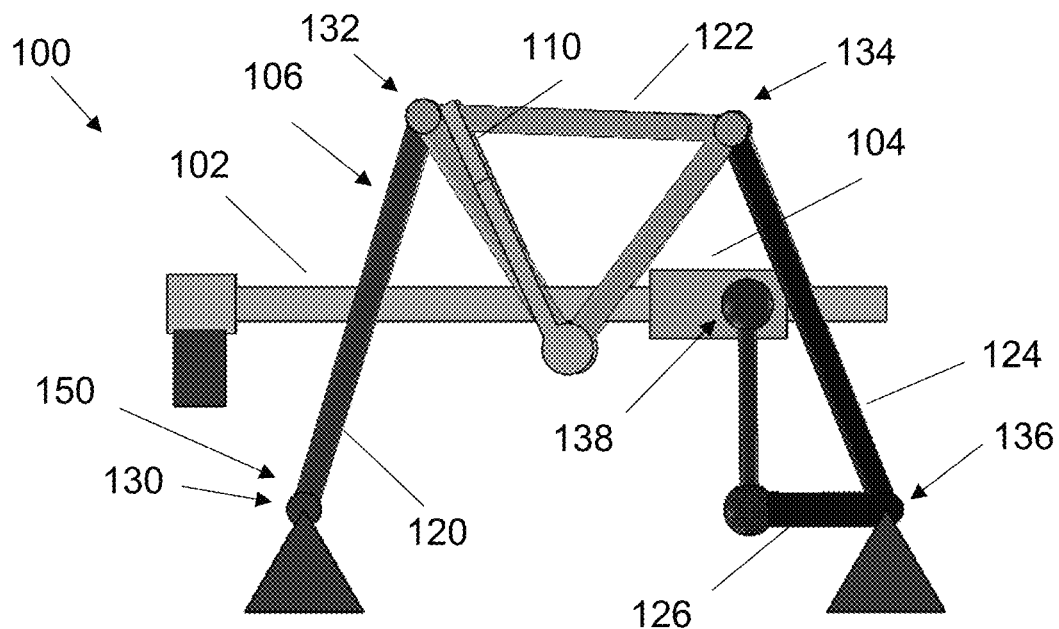
FIGS. 2A-2B illustrate left side and perspective views, respectively, of one embodiment of a rudder input control device.
Figure 2B:
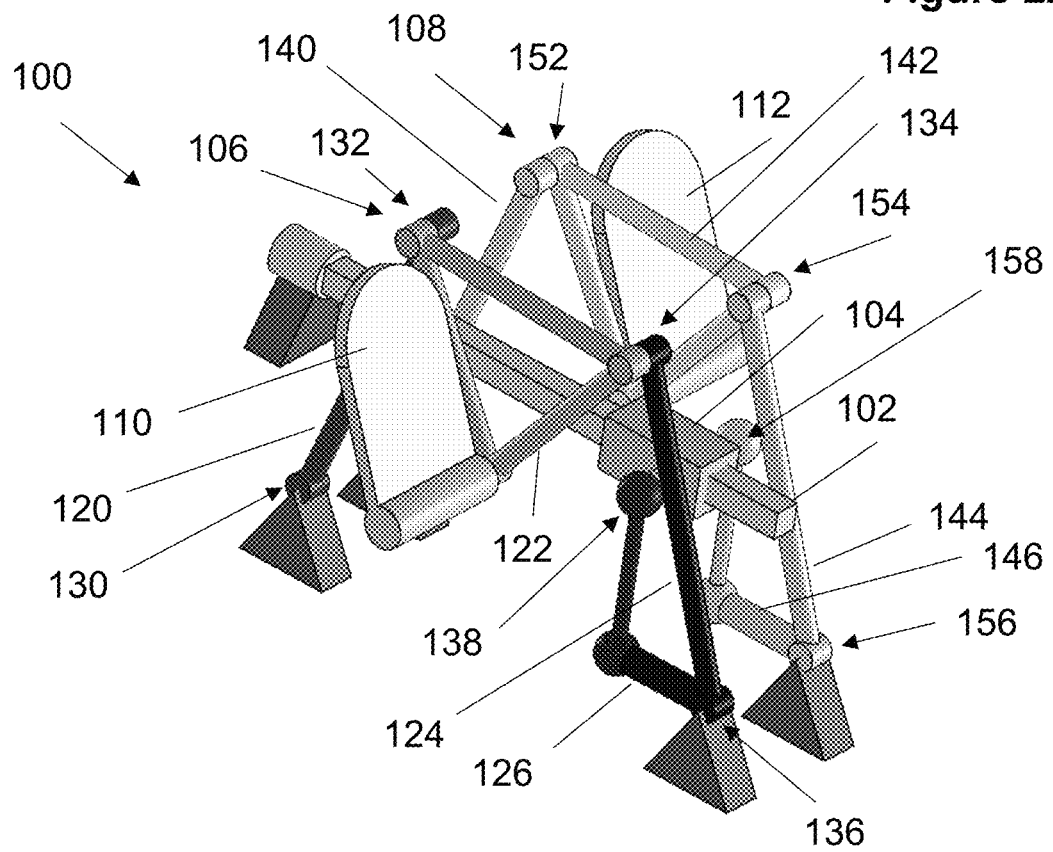

FIGS. 2A-2B illustrate one embodiment of a rudder input control device 100. A shaft 102 has a first axis extending along of the shaft 102 in a forward/aft direction. A first component 104 can be disposed on the shaft 102 and configured to be constrained rotationally to the shaft and controllably displaced longitudinally along the first axis of the shaft 102 in forward and aft directions. It is contemplated that one end, and preferably both ends, of the shaft 102, are mounted to the aircraft with rotational joints.

The device 100 further comprises a first pedal 110 and a second pedal 112.

Preferably, the first component 104 is coupled to the first pedal 110 via a first linkage 106, such that movement of the first pedal 110 causes movement of the first linkage 106 and the first component 104. Similarly, the first component 104 is coupled to the second pedal 112 via a second linkage 108, such that movement of the second pedal 112 causes movement of the second linkage 108 and the first component 104.

In some embodiments, the shaft 102 comprises a longitudinally splined interface and the first component 104 comprises a shuttle constrained rotationally to the shaft. Controlled longitudinal displacement of the shuttle forward or aft on the shaft allows both pedals (110, 112) to move forward or aft in unison for ergonomic pedal adjustment via first and second linkages (106, 108).

As shown in the Figures, the common shaft 102 interconnects the first pedal 110 and the second pedal 112, such that forward movement of the first pedal 110 causes rotational movement of the first component 104 which causes movement of the second pedal 112 in the aft direction. In a similar manner, forward movement of the second pedal 112 causes rotational movement of the first component 104 which causes movement of the first pedal 110 in the aft direction.

The shaft 102 is disposed between the first linkage 106 and the second linkage 108. The first linkage 106 and the second linkage 108 are disposed between the first pedal 110 and the second pedal 112.

Preferably, each of the first linkage 106 and the second linkage 108 comprises a multi-bar linkage such as shown in FIGS. 2A-2B. In this manner, the first linkage 106 is configured to convert a forward motion of the first pedal 110 into a rotational motion that causes movement of the first component 104 rotationally at the shaft 102, and the second linkage 108 is configured to convert a forward motion of the second pedal 112 into a rotational motion that also causes movement of the first component 104 rotationally at the axis of shaft 102.

The first linkage 106 comprises a first link 120, a second link 122, a third link 124 which further comprises a crank 126. The first link 120 is rotatable at a first point 130 that is fixed in position, such as to a floor or other surface of the cockpit of the aircraft, for example. The third link 124 is rotatable at a fourth point 136 that is also fixed in position. The first link 120 is rotatably coupled to the second link 122 at a second point 132, and the second link 122 is rotatably coupled to the third link 124 at a third point 134. In this manner, movement of any of the first link 120, second link 122, or third link 124 results in movement of the other links. Similarly, movement of the first pedal 110 causes movement of the first link 120, second link 122, and third link 124, which changes a location of each of the second point 132 and the third point 134.

The third link 124 further comprises a fixed crank 126 which is rotatably coupled to the first component 104 at a second end 138. Thus, in the embodiment shown in FIG. 2A, the crank 126 is fixed to the third link 124 at point 136 and is rotatably coupled to the first component 104 at the second end 138. In this manner, forward movement of the first pedal 110 causes movement of the first link 120, second link 122, third link 124 and crank 126, which causes rotational movement of the first component 104 at the axis of shaft 102.

As shown in FIG. 2B, the second linkage 108 comprises a first link 140, a second link 142, a third link 144 which comprises a crank 146. The first link 140 is rotatable at a first point 150 that is fixed in position, such as to a floor or other surface of the cockpit of the aircraft, for example. The third link 144 is rotatable at a fourth point 156 that is also fixed in position. The first link 140 is rotatably coupled to the second link 142 at a second point 152, and the second link 142 is rotatably coupled to the third link 144 at a third point 154. In this manner, movement of any of the first link 140, second link 142, or third link 144 results in movement of the other links. Similarly, movement of the second pedal 112 causes movement of the first link 140, second link 142, third link 144, which changes a location of each of the second point 152 and the third point 154.

The third link 144 further comprises a fixed crank 146 which is rotatably coupled to the first component 104 at a second end 158. Thus, in the embodiment shown in FIG. 2B, the crank 146 is fixed to the third link 144 at point 156 and is rotatably coupled to the first component 104 at the second end 158. In this manner, forward movement of the second pedal 112 causes movement of the first link 140, second link 142, third link 144 and crank 146, which causes rotational movement of the first component 104 at the axis of shaft 102.

As shown, forward movement of either the first pedal 110 or the second pedal 112 will cause the other of the pedals to move in an aft direction, by translating the linear forward movement of the pedal into rotation motion using the respective linkage and then back into linear movement of the other pedal.

It is contemplated that the device 100 can further comprise a pedal adjustment mechanism configured to allow forward or aft movement of the first pedal 110 and the second pedal 112. In this manner, a position of the pedals can be adjusted to accommodate different heights of pilots, for example. In some embodiments, the pedal adjustment mechanism comprises an adjustable yoke configured to allow adjustment of the forward and aft positions of the first pedal 110 and the second pedal 112. In other embodiments, the pedal adjustment mechanism can be accomplished using a leadscrew.

It is further contemplated that the device 100 may comprise a pedal adjustment mechanism configured to allow an angular adjustment of the first pedal 110 and the second pedal 112. In this manner, it is contemplated that the mechanism could permit the first pedal 110 and/or the second pedal 112 to be tilted or rotated about an axis of rotation to accommodate the feet of the pilot.

Figure 3A:
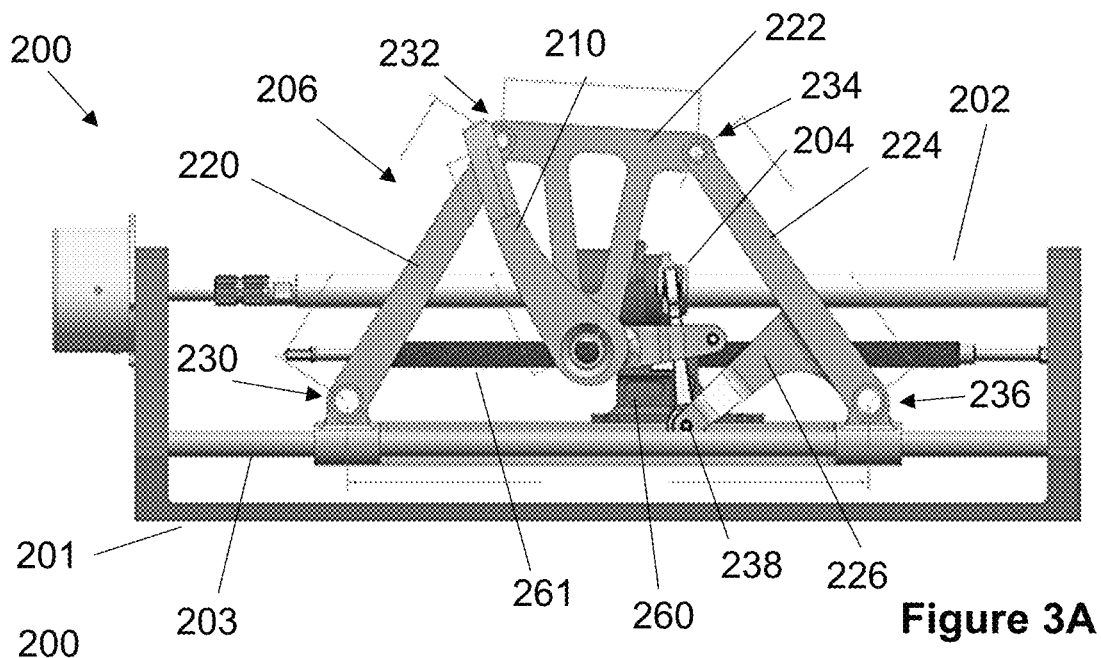
FIGS. 3A-3B illustrate left side and perspective views, respectively, of another embodiment of a rudder input control device.
Figure 3B:
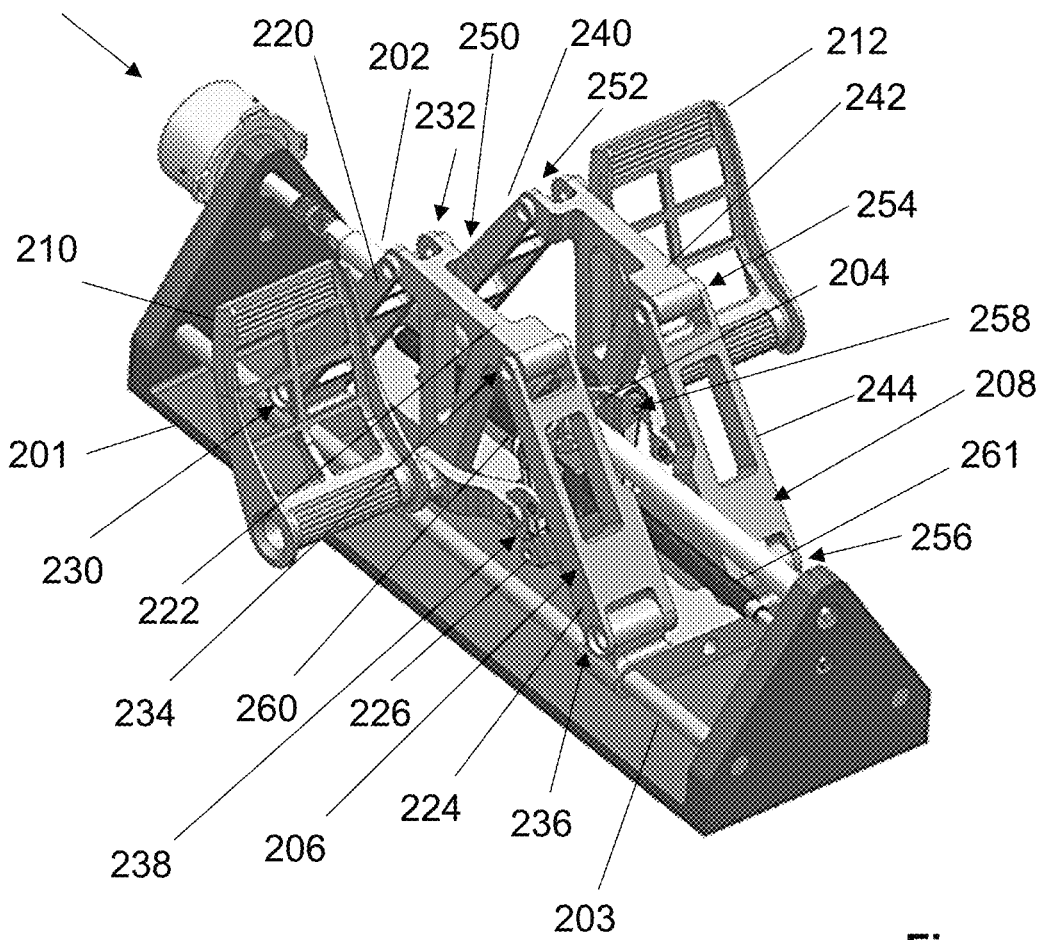

FIGS. 3A-3B illustrate another embodiment of a rudder input control device 200. A shaft 202 has a first axis extending along an axis of the shaft 202 in a forward/aft direction. A first component 204 is disposed on the shaft 202 and configured to be constrained rotationally to the shaft and controllably displaced longitudinally along the axis of the shaft 202 in forward and aft directions. It is contemplated that one end, and preferably both ends, of the shaft 202, are mounted to a structure and/or the aircraft with rotational joints.

The device 200 further comprises a first pedal 210 and a second pedal 212.

Preferably, the first component 204 is coupled to the first pedal 210 via a first linkage 206, such that movement of the first pedal 210 causes movement of the first linkage 206 and the first component 204. Similarly, the first component 204 is coupled to the second pedal 212 via a second linkage 208, such that movement of the second pedal 212 causes movement of the second linkage 208 and the first component 204.

In some embodiments, the shaft 202 comprises a longitudinally splined interface and the first component 204 comprises a shuttle constrained rotationally to the shaft 202. Controlled longitudinal displacement of the shuttle forward or aft on the shaft 202 allows both pedals (210, 212) to move forward or aft in unison for ergonomic pedal adjustment via first and second linkages (206, 208).

The shaft 202 interconnects the first pedal 210 and the second pedal 212, such that forward movement of the first pedal 210 causes rotational movement of the first component 204 which causes movement of the second pedal 212 in the aft direction. In a similar manner, forward movement of the second pedal 212 causes rotational movement of the first component 204 which causes movement of the first pedal 210 in the aft direction.

The shaft 202 is disposed between the first linkage 206 and the second linkage 208. The first linkage 206 and the second linkage 208 are disposed between the first pedal 210 and the second pedal 212. As shown, device 200 comprises a housing 201 by which the various components of the device 200 can be mounted or supported. One or more support beams 203 can be supported by the housing 201. The first and second linkages 206, 208 are preferably slidably coupled to the one or more support beams 203 with a sliding carriage 260, which thereby provide support to the first and second linkages 206, 208 and first and second pedals 210, 212. The sliding carriage 260 comprises a fixed nut which is controllably displaced forward and aft by rotation of the leadscrew 261 which is constrained in the forward and aft direction to the housing 201. The first component 204 is constrained in the forward and aft direction to the sliding carriage 260 but is not constrained by the sliding carriage 260 in rotation along the axis of the shaft 202.

Preferably, each of the first linkage 206 and the second linkage 208 comprises a multi-bar linkage such as shown in FIGS. 3A-3B. In this manner, the first linkage 206 is configured to convert a forward motion of the first pedal 210 into a rotational motion that causes movement of the first component 204 rotationally at the axis of shaft 202, and the second linkage 208 is configured to convert a forward motion of the second pedal 212 into a rotational motion that also causes movement of the first component 204 rotationally at the axis of shaft 202.

The first linkage 206 comprises a first link 220, a second link 222, a third link 224 which further comprises a crank 226. The first link 220 is rotatable at a first point 230 that is coupled to a support beam 203 by a sliding carriage 260. The third link 224 is rotatable at a fourth point 236 that is also coupled to the support beam 203 by a sliding carriage 260. The first link 220 is rotatably coupled to the second link 222 at a second point 232, and the second link 222 is rotatably coupled to the third link 224 at a third point 234. In this manner, movement of any of the first link 220, second link 222, or third link 224 results in movement of the other links. Similarly, movement of the first pedal 210 causes movement of the first link 220, second link 222, and third link 224, which changes a position of each of the second point 232 and the third point 234.

The third link 224 further comprises a fixed crank 226 which is coupled to the first component 204 at a second end 238. Thus, in the embodiment shown in FIG. 3A, the crank 226 is fixed to the third link 224 at point 236 and is coupled to the first component 204 at the second end 238. In this manner, forward movement of the first pedal 210 causes movement of the first link 220, second link 222, third link 224 and crank 226, which causes rotational movement of the first component 204 at the axis of shaft 202.

As shown in FIG. 3B, the second linkage 208 comprises a first link 240, a second link 242, a third link 244 which comprises a crank 246. The first link 240 is rotatable at a first point 250 that is fixed in position, such as to a floor or other surface of the cockpit of the aircraft, for example. The third link 244 is rotatable at a fourth point 256 that is also fixed in position. The first link 240 is rotatably coupled to the second link 242 at a second point 252, and the second link 242 is rotatably coupled to the third link 244 at a third point 254. In this manner, movement of any of the first link 240, second link 242, or third link 244 results in movement of the other links. Similarly, movement of the second pedal 212 causes movement of the first link 240, second link 242, third link 244, which changes a location of each of the second point 252 and the third point 254.

As discussed above, the third link 244 further comprises a fixed crank 246 which is coupled to the first component 204 at a second end 258. Thus, in the embodiment shown in FIG. 3B, the crank 246 is fixed to the third link 224 at point 256 and is coupled to the first component 204 at the second end 258. In this manner, forward movement of the second pedal 212 causes movement of the first link 240, second link 242, third link 244 and crank 246, which causes rotational movement of the first component 204 at the axis of shaft 202.

As shown, forward movement of either the first pedal 210 or the second pedal 212 will cause the other of the pedals to move in an aft direction, by translating the linear forward movement of the pedal into rotation motion using the respective linkage and then back into linear movement of the other pedal.

It is contemplated that the device 200 can further comprise a pedal adjustment mechanism configured to allow forward or aft movement of the first pedal 210 and the second pedal 212. In this manner, a position of the pedals can be adjusted to accommodate different heights of pilots, for example. In some embodiments, the pedal adjustment mechanism comprises an adjustable yoke configured to allow adjustment of the forward and aft positions of the first pedal 210 and the second pedal 212.

It is further contemplated that the device 200 may comprise a pedal adjustment mechanism configured to allow an angular adjustment of the first pedal 210 and the second pedal 212. In this manner, it is contemplated that the mechanism could permit the first pedal 210 and/or the second pedal 212 to be tilted or rotated about an axis of rotation to accommodate the feet of the pilot.

Figure 4A:
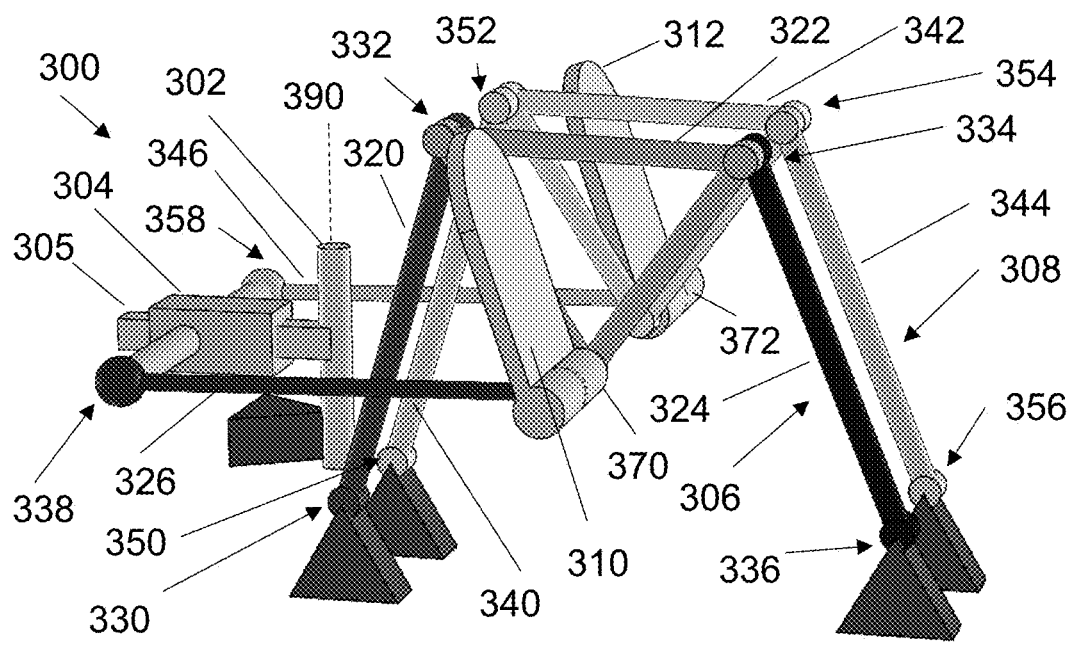
FIGS. 4A-4C illustrate various views of another embodiment of a rudder input control device, showing movement of the left and right pedals.
Figure 4B:
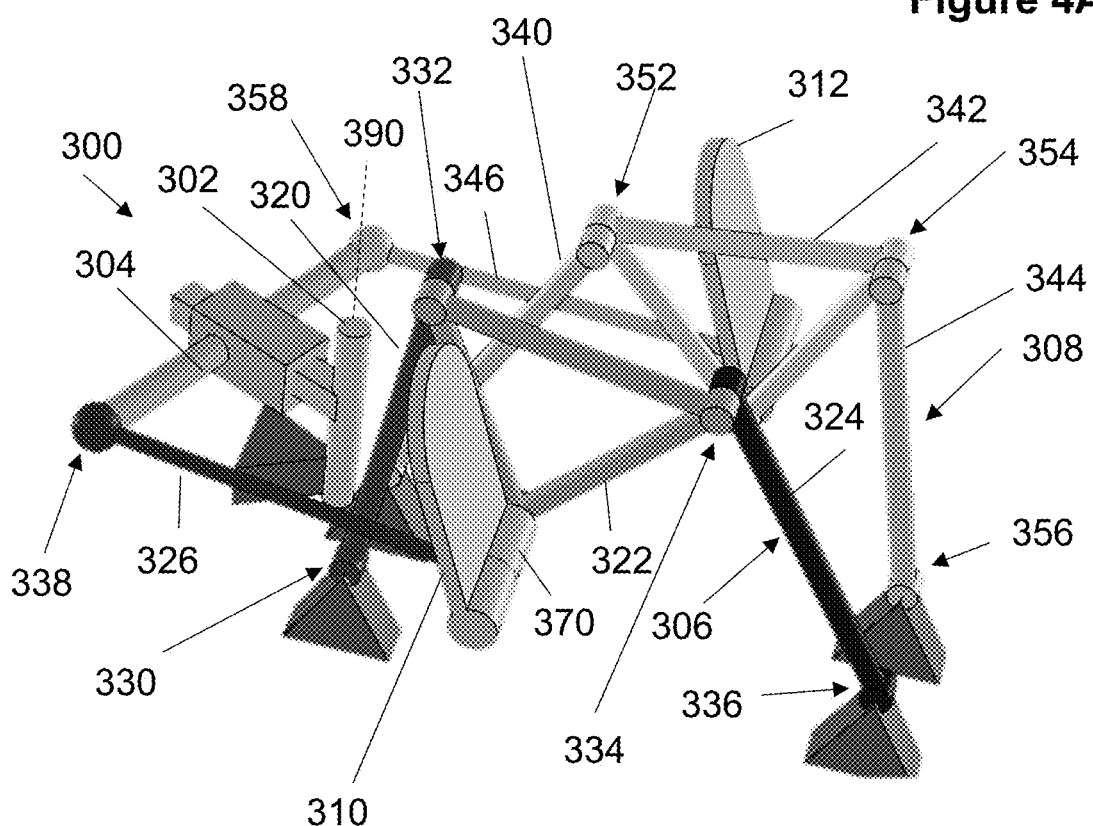
Figure 4C:
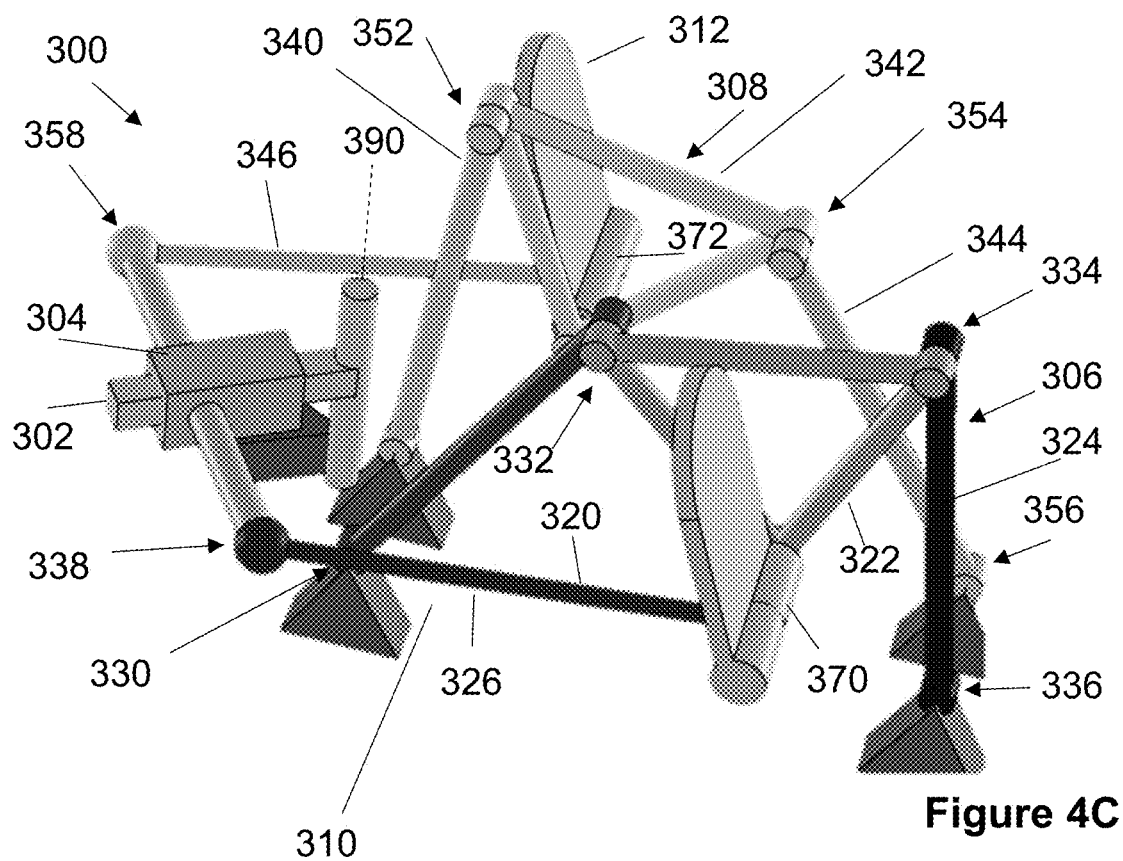

FIGS. 4A-4C illustrate one embodiment of a rudder input control device 300. A shaft 302 has a first axis extending along of the shaft 302 perpendicular to a forward/aft direction. The device 300 further comprises a first pedal 310 and a second pedal 312.

The shaft 302 comprises a second shaft 305 attached thereto. A first component 304 can disposed on the second shaft 305 and configured to move perpendicular to the first axis 390 of the shaft 302 in forward and aft directions along the second shaft 305. By allowing movement of the first component 304 along the second shaft 305, this advantageously allows for adjustment of a position of the first and second pedals 310, 312 with respect to the shaft 302. In this manner, the device 300 can accommodate pilots having different heights, for example.

Preferably, the first component 304 is coupled to the first pedal 310 via a first linkage 306, such that movement of the first pedal 310 causes movement of the first linkage 306 and the first component 304. Similarly, the first component 304 is coupled to the second pedal 312 via a second linkage 308, such that movement of the second linkage 308 and the first component 304.

The shaft 302 is configured to rotate about the first axis 390 and interconnects the first pedal 310 and the second pedal 312, such that forward movement of the first pedal 310 causes rotation of the shaft 302 about the first axis 390 (as shown in FIGS. 4B and 4C), which in turn causes movement of the second pedal 312 in the aft direction.

The shaft 302 is disposed between the first linkage 306 and the second linkage 308. The first linkage 306 and the second linkage 308 are disposed between the first pedal 310 and the second pedal 312.

Preferably, each of the first linkage 306 and the second linkage 308 comprises a multi-bar linkage such as shown in FIGS. 4A-4C. In this manner, the first linkage 306 is configured to convert a forward motion of the first pedal 310 into a rotational motion that causes rotation of the shaft 302 about the first axis 390, and the second linkage 308 is configured to convert a forward motion of the second pedal 312 into a rotational motion that also causes rotation of the shaft 302 about the first axis 390.

The first linkage 306 comprises a first link 320, a second link 322, a third link 324 and a fourth link 326. The first link 320 is rotatable at a first point 330 that is fixed in position, such as to a floor or other surface of the cockpit of the aircraft, for example. The third link 324 is rotatable at a fourth point 336 that is also fixed in position. The first link 320 is rotatably coupled to the second link 322 at a second point 332, and the second link 322 is rotatably coupled to the third link 324 at a third point 334. In this manner, movement of any of the first link 320, second link 322, or third link 324 results in movement of the other links. Similarly, movement of the first pedal 310 causes movement of the first link 320, second link 322, and third link 324, which changes a position of each of the second point 332 and the third point 334.

The first linkage 306 further comprises a fourth link 326 rotatably coupled at a first end to one of the links 320, 322, 324, and preferably the second link 322, and rotatably coupled to the first component 304 at a second end 338. Thus, in the embodiment shown in FIGS. 4A-4C, the fourth link 326 is rotatably coupled at point 370 to the second link 322 and is rotatably coupled to the first component 304 at the second end 338. In this manner, forward movement of the first pedal 310 causes movement of the first link 320, second link 322, third link 324 and fourth link 326, which causes rotation of the shaft 302 about the first axis 390 (as shown in FIG. 4B).

As shown in FIG. 4A-4C, the second linkage 308 comprises a first link 340, a second link 342, a third link 344 and a fourth link 346. The first link 340 is rotatable at a first point 350 that is fixed in position, such as to a floor or other surface of the cockpit of the aircraft, for example. The third link 344 is rotatable at a fourth point 356 that is also fixed in position. The first link 340 is rotatably coupled to the second link 342 at a second point 352, and the second link 342 is rotatably coupled to the third link 344 at a third point 354. In this manner, movement of any of the first link 340, second link 342, or third link 344 results in movement of the fourth link 346. Similarly, movement of the second pedal 312 causes movement of the first link 340, second link 342, third link 344 and fourth link 346, which changes a position of each of the second point 352 and the third point 354.

The fourth link 346 is rotatably coupled at a first end to one of the links 340, 342, 344, and preferably the second link 342 and is rotatably coupled to the first component 304 at a second end 358. Thus, in the embodiment shown in FIGS. 4A-4C, the fourth link 346 is rotatably coupled at point 372 to the second link 342 and is rotatably coupled to the first component 304 at the second end 358. In this manner, forward movement of the second pedal 312 causes movement of the first link 340, second link 342, third link 344 and fourth link 346, which causes rotation of the shaft 302 about the first axis 390 (as shown in FIG. 4C).

As shown, forward movement of either the first pedal 310 or the second pedal 312 will cause the other of the pedals to move in an aft direction, by translating the linear forward movement of the pedal into rotation motion using the respective linkage and then back into linear movement of the other pedal.

As discussed above, the first component 304 can further comprise a pedal adjustment mechanism configured to allow forward or aft movement of the first pedal 310 and the second pedal 312. In this manner, a position of the pedals can be adjusted to accommodate different heights of pilots, for example. In some embodiments, the first component 304 comprises an adjustable yoke configured to allow adjustment of the forward and aft positions of the first pedal 310 and the second pedal 312, by permitting movement of the first component 304 along the shaft 305 in a forward or aft direction.

It is further contemplated that the device 300 may comprise a pedal adjustment mechanism configured to allow an angular adjustment of the first pedal 310 and the second pedal 312. In this manner, it is contemplated that the mechanism could permit the first pedal 310 and/or the second pedal 312 to be tilted or rotated about an axis of rotation to accommodate the feet of the pilot.

Figure 5:
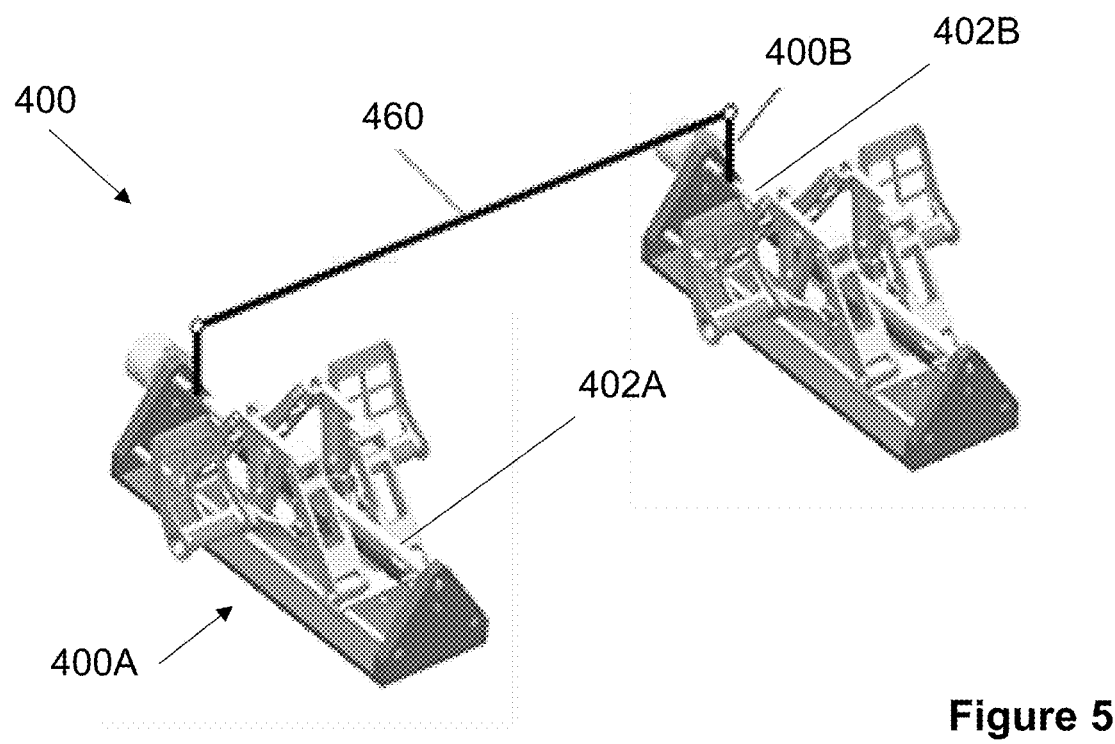
FIG. 5 illustrates a schematic of another embodiment of a rudder control system.

FIG. 5 illustrates one embodiment of a rudder input control system 400. As shown in FIG. 5, the system 400 comprises two of the devices 200 described above shown in FIGS. 3A and 3B. The two devices (here, device 400A and device 400B) can be interconnected by a third linkage 460 to provide for interconnected pedals for shared rudder motion between pilots. In this manner, when the linkage rod 402 of one of the devices 400A or 400B rotates, this causes the third linkage to rotate and move, thereby rotating the other linkage rod of the other device.

As an example, when the first pedal of device 400A is moved forward, linkage rod 402A of device 400A is caused to rotate by the first linkage (as described above). This rotation of the linkage rod 402A causes movement of the third linkage 460, which then causes linkage rod 402B of the device 400B to also rotate and by way of the first linkage, causes the first pedal of the device 400B to also move forward. The same holds true if another pedal is pressed forward. The third linkage 460 interconnects the two devices 400A, 400B, ensuring that movement of a pedal in one device similarly moves a pedal in the other device.

Figure 6:
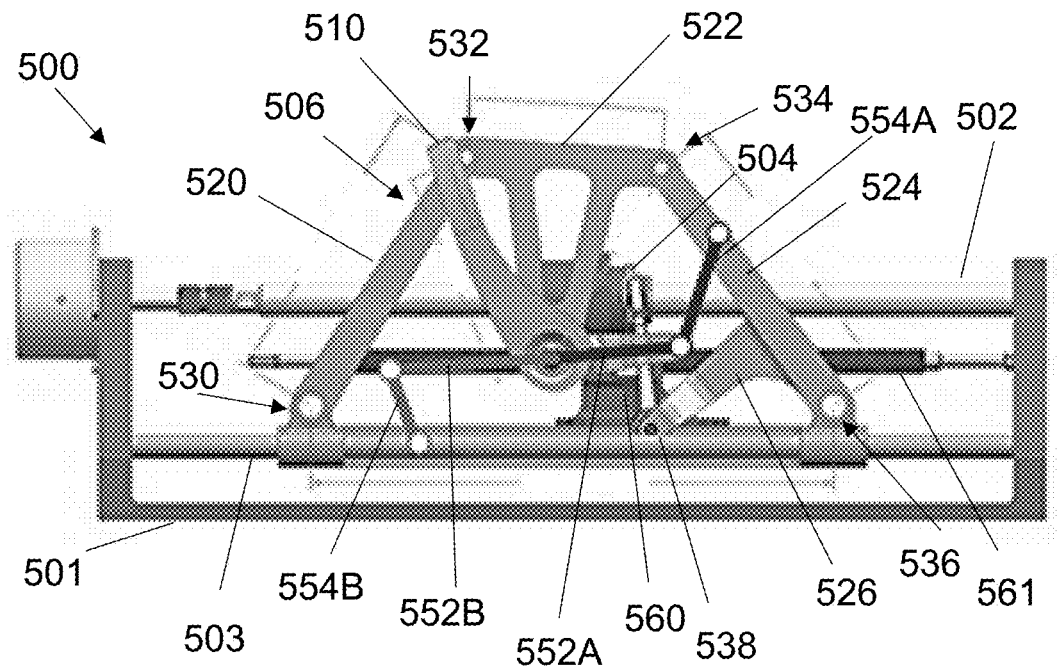
FIG. 6 illustrates a schematic of another embodiment of a rudder input control device.

FIG. 6 illustrates another embodiment of a rudder input control device 500. A shaft 502 has a first axis extending along the shaft 502 in a forward/aft direction. A first component 504 is disposed on the shaft 502 and configured to move longitudinally along the axis of the shaft 502 in forward and aft directions. It is contemplated that one end, and preferably both ends, of the shaft 502, are mounted to a structure and/or the aircraft.

Similar to the device 200 shown in FIG. 3A, device 500 comprises a first pedal 510 and a second pedal (not shown).

Preferably, the first component 504 is coupled to the first pedal 510 via a first linkage 506, such that movement of the first pedal 510 causes movement of the first linkage 506 and the first component 504. Similarly, the first component 504 can be coupled to the second pedal via a second linkage, such as described above with respect to FIGS. 3A-3B.

In some embodiments, the shaft 502 comprises a longitudinally splined interface and the first component 504 comprises a shuttle constrained rotationally to the shaft 502. Controlled longitudinal displacement of the shuttle forward or aft on the shaft 502 allows both pedals (510, 512) to move forward or aft in unison for ergonomic pedal adjustment via first and second linkages (506, 508).

As discussed above, the shaft 502 interconnects the first pedal 510 and the second pedal, such that forward movement of the first pedal 510 causes rotational movement of the first component 504 which causes movement of the second pedal in the aft direction. In a similar manner, forward movement of the second pedal causes rotational movement of the first component 504 which causes movement of the first pedal 510 in the aft direction.

As shown, device 500 comprises a housing 501 by which the various components of the device 500 can be mounted or supported. One or more support beams 503 can be supported by the housing 501. The first linkage 506 is preferably slidably coupled to the one or more of the support beams 503 with a sliding carriage 560, which thereby provide support to the first linkage 506 and first pedal 510. The sliding carriage 560 comprises a fixed nut which is controllably displaced forward and aft by rotation of the leadscrew 561 which is constrained in the forward and aft direction to the housing 501. The first component 504 is constrained in the forward and aft direction to the sliding carriage 560 but is not constrained by the sliding carriage 560 in rotation along the axis of the shaft 502.

As shown in FIG. 6, the first linkage 506 comprises a six-bar linkage. In this manner, the first linkage 506 is configured to convert a forward motion of the first pedal 510 into a rotational motion that causes rotational movement of the first component 504 at the axis of shaft 502. The first linkage 506 comprises a first link 520, a second link 522, a third link 524 which further comprises a crank 526. The first link 520 is rotatable at a first point 530 that is coupled to a support beam 503 by a sliding carriage 560. The third link 524 is rotatable at a fourth point 536 that is also coupled to the support beam 503 by a sliding carriage 560. The first link 520 is rotatably coupled to the second link 522 at a second point 532, and the second link 522 is rotatably coupled to the third link 524 at a third point 534. In this manner, movement of any of the first link 520, second link 522, or third link 524 results in movement of the other links. Similarly, movement of the first pedal 510 causes movement of the first link 520, second link 522, and third link 524, which changes a position of each of the second point 532 and the third point 534.

The third link 524 further comprises a fixed crank 526 which is coupled to the first component 504 at a second end 538. In this manner, forward movement of the first pedal 510 causes movement of the first link 520, second link 522, third link 524 and crank 526, which causes rotational movement of the first component 504 at the axis of shaft 502.

Device 500 further comprises a pedal tilt mechanism defined by a fifth link 552 which is fixed to the pedal and a sixth link 554 which rotatably connects the fifth link 552 to another link in linkage 506. The pedal tilt mechanism is configured to control the pedal angle with respect to the pedal forward displacement. As shown in FIG. 6, in some embodiments, the sixth link 554A rotatably connects the fifth link 552A to the first link 520 or preferentially to the third link 524. In another embodiment, the sixth link 554B rotatably connects the fifth link 552B to the carriage 560. In this manner, it is contemplated that the mechanism could control the first pedal 510 to be tilted or rotated about an axis of rotation as a function of forward displacement to accommodate the ergonomics of the foot of the pilot.

In some embodiments, device 500 may further comprise a second pedal adjustment mechanism that is configured to allow forward or aft movement of the first pedal 510. In this manner, a position of the pedal can be adjusted to accommodate different heights of pilots, for example. In some embodiments, the pedal adjustment mechanism comprises an adjustable yoke configured to allow adjustment of the forward and aft positions of the pedals, such as described above.

Figure 7:
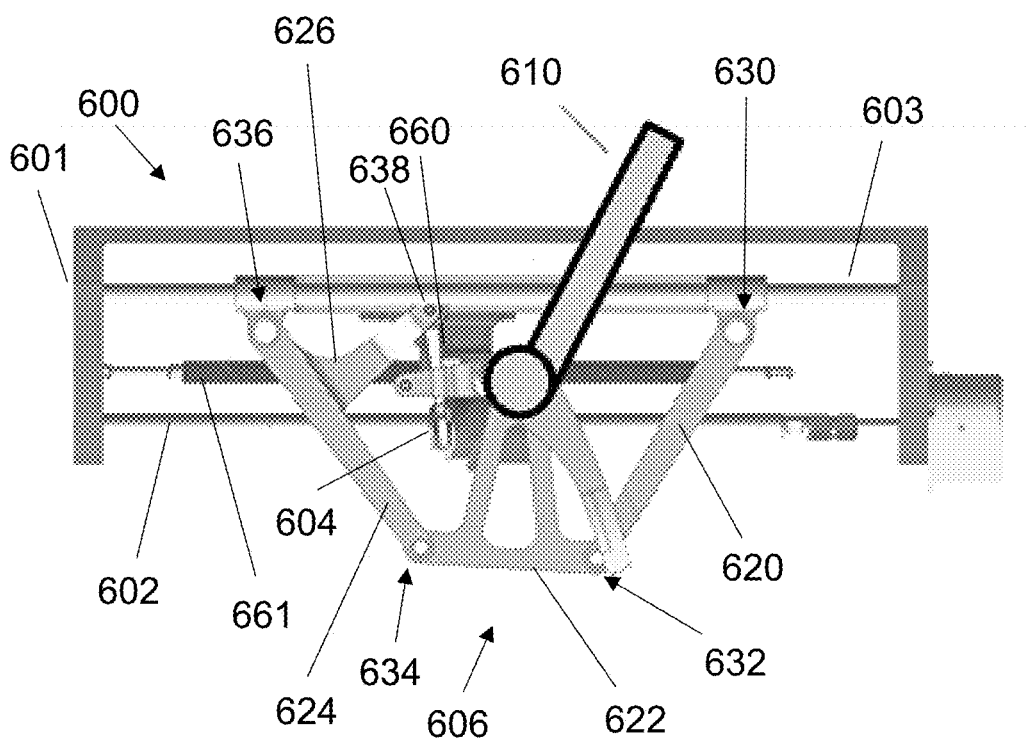
FIG. 7 illustrates a schematic of another embodiment of a rudder input control device.

FIG. 7 illustrates another embodiment of a rudder input control device 600. Device 600 is similar to the device 200 shown in FIG. 3A, except that the mechanism if flipped upside down with the first pedal 610 disposed above the shaft 602 and the first linkage 606.

Shaft 602 has a first axis extending along an axis of the shaft 602 in a forward/aft direction. A first component 604 is disposed on the shaft 602 and configured to be constrained rotationally to the shaft and controllably displaced longitudinally along the axis of the shaft 602 in forward and aft directions. It is contemplated that one end, and preferably both ends, of the shaft 602, are mounted to a structure and/or the aircraft with rotational joints.

With respect to the remaining numerals in FIG. 7, the same considerations for like components with like numerals of FIG. 3A apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A rudder input control device, comprising:
 a first pedal and a second pedal;
 a first linkage and a second linkage, wherein the first linkage comprises a first link, a second link, and a third link, and wherein the first link is rotatable at a first point that is fixed in position, wherein the third link is rotatable at a fourth point that is fixed in position, and wherein the second link is rotatably coupled to the first link at a second point and is rotatably coupled to the third link at a third point;
 a shaft having a first axis;
 a first component configured to move rotationally with the first axis of the shaft;
 wherein the first component is coupled to the first pedal via the first linkage, such that movement of the first pedal causes movement of the first linkage and the first component, and wherein the first linkage is configured to convert a forward motion of the first pedal into a rotational motion that causes rotational movement of the first component at the first axis of the shaft; and
 wherein the first component is coupled to the second pedal via the second linkage, such that movement of the second pedal causes movement of the second linkage and the first component.

2. The device of claim 1, wherein the shaft further comprises longitudinal splines which couple with the first component to constrain rotational motion of the first component along the shaft and permit longitudinal displacement of the first component at the first axis of the shaft.

3. The device of claim 1, wherein the shaft interconnects the first and second pedals, such that forward movement of the first pedal causes rotation of the first component which causes movement of the second pedal in the aft direction.

4. The device of claim 1, wherein movement of the first pedal causes movement of the first, second and third links, and changes a location of each of the second and third points.

5. The device of claim 1, wherein the first linkage further comprises a crank fixed to the first or second link at a first end and coupled to the first component at a second end.

6. The device of claim 1, further comprising a pedal adjustment mechanism configured to allow forward or aft movement of the first and second pedals, wherein the pedal adjustment mechanism comprises an adjustable yoke configured to allow adjustment of the forward and aft positions of the first and second pedals.

7. The device of claim 6, further comprising a carriage constrained to move forward and aft and coupled to the first and second linkages.

8. The device of claim 7, wherein movement of the carriage is constrained to forward and aft motion by one or more beams, a linkage, or a leadscrew.

9. The device of claim 1, further comprising a second pedal adjustment mechanism configured to allow an angular adjustment of the first pedal.

10. The device of claim 1, wherein the first and second linkages are disposed between the first and second pedals, and wherein the shaft is disposed between the first and second linkages.

11. A rudder input control device comprising:
a first pedal and a second pedal;
a first linkage and a second linkage;
a shaft having a first axis;
a first component configured to move rotationally with the first axis of the shaft;
wherein the first component is coupled to the first pedal via the first linkage, such that movement of the first pedal causes movement of the first linkage and the first component;
wherein the first component is coupled to the second pedal via the second linkage, such that movement of the second pedal causes movement of the second linkage and the first component;
wherein the first linkage is configured to convert a forward motion of the first pedal into a rotational motion that causes rotational movement of the first component at the axis of the shaft, wherein the first linkage further comprises a first link, a second link and a third link, wherein the first link is rotatable at a first point that is fixed in position and wherein the third link is rotatable at a fourth point that is fixed in position, and wherein the second link is rotatably coupled to the first link at a second point and is rotatably coupled to the third link at a third point; and
wherein the first linkage further comprises a fifth link and a sixth link, wherein the fifth link is fixed to the pedal and rotatably coupled to the second link and coupled to the sixth link, and wherein the sixth link is rotatably coupled to the first link, the third link, or a fixed frame such that a pedal tilt is controlled over linkage displacement.

12. A rudder input control device, comprising:
a first pedal and a second pedal;
a first linkage and a second linkage;
a shaft rotatable about a first axis;
wherein the shaft is coupled to the first pedal via the first linkage, such that forward movement of the first pedal causes movement of the first linkage which causes the shaft to rotate about the first axis in a first direction;
wherein the shaft is coupled to the second pedal via the second linkage, such that forward movement of the second pedal causes movement of the second linkage which causes the shaft to rotate about the first axis in a second direction opposite of the first direction; and
wherein the first linkage is configured to convert a forward motion of the first pedal into a rotational motion that causes rotation of the shaft, wherein the first linkage comprises a first link, a second link and a third link, wherein the first link is rotatable at a first point that is fixed in position and wherein the third link is rotatable at a fourth point that is fixed in position, and wherein the second link is rotatably coupled to the first link at a second point and is rotatably coupled to the third link at a third point, and wherein movement of the first pedal causes movement of the first, second and third links, and changes a location of each of the second and third points.

13. The device of claim 12, further comprising a first component configured to move perpendicular to the first axis in forward and aft directions along a second shaft attached to the first shaft to allow adjustment of a position of the first and second pedals with respect to the shaft.

14. The device of claim 12, wherein the shaft is coupled to the first pedal via the first component which is coupled to the first linkage, such that forward movement of the first pedal causes the shaft to rotate about the first axis in a first direction.

15. The device of claim 12, wherein the shaft interconnects the first and second pedals, such that forward movement of the first pedal causes the shaft to rotate about the first axis in the first direction, which causes movement of the second pedal in the aft direction.

16. The device of claim 12, wherein the shaft interconnects the first and second pedals, such that forward movement of the second pedal causes the shaft to rotate about the first axis in the second direction, which causes movement of the first pedal in the aft direction.

17. The device of claim 12, wherein the first linkage further comprises a crank fixed to the first or second link at a first end and coupled to the first component at a second end, and wherein movement of the first pedal causes movement of the first, second and third links, and wherein movement of the first or second link causes rotation of the shaft.

18. A rudder input control device comprising:
a first pedal and a second pedal;
a first linkage and a second linkage;
a first shaft rotatable about a first axis;
wherein the first shaft is coupled to the first pedal via the first linkage, such that forward movement of the first pedal causes movement of the first linkage which causes the first shaft to rotate about the first axis in a first direction; and
wherein the first shaft is coupled to the second pedal via the second linkage, such that forward movement of the second pedal causes movement of the second linkage which causes the first shaft to rotate about the first axis in a second direction opposite of the first direction;
wherein the first shaft interconnects the first and second pedals, such that forward movement of the second pedal causes the first shaft to rotate about the first axis in the second direction, which causes movement of the first pedal in the aft direction;

a first component configured to move perpendicular to the first axis in forward and aft directions along a second shaft attached to the first shaft to allow adjustment of a position of the first and second pedals with respect to the first shaft;

wherein the first linkage is configured to convert a forward motion of the first pedal into a rotational motion that causes rotation of the first shaft, wherein the first linkage comprises a first link, a second link and a third link, wherein the first link is rotatable at a first point that is fixed in position and wherein the third link is rotatable at a fourth point that is fixed in position, and wherein the second link is rotatably coupled to the first link at a second point and is rotatably coupled to the third link at a third point, and wherein movement of the first pedal causes movement of the first, second and third links, and changes a location of each of the second and third points;

wherein the first linkage further comprises a fifth link and a sixth link, wherein the fifth link is fixed to the pedal and rotatably coupled to the second link and coupled to the sixth link, and wherein the sixth link is rotatably coupled to the first link, the third link, or a fixed frame such that a pedal tilt is controlled over linkage displacement.

\* \* \* \* \*